United States Patent [19]

Lustig et al.

[11] Patent Number: 4,547,413
[45] Date of Patent: * Oct. 15, 1985

[54] SHRINKABLE FILM FOR POULTRY BAGS

[75] Inventors: Stanley Lustig, Park Forest; Jeffrey M. Schuetz, Downers Grove; Stephen J. Vicik, Darien, all of Ill.

[73] Assignee: Union Carbide Corporation, Danbury, Conn.

[*] Notice: The portion of the term of this patent subsequent to May 8, 2001 has been disclaimed.

[21] Appl. No.: 624,952

[22] Filed: Jun. 27, 1984

Related U.S. Application Data

[63] Continuation-in-part of Ser. No. 445,941, Dec. 1, 1982, Pat. No. 4,447,480.

[51] Int. Cl.[4] .................. A21D 10/02; C08L 23/04; B65D 33/00
[52] U.S. Cl. .................................. 428/35; 206/497; 383/908; 426/129; 525/222; 525/240
[58] Field of Search ................ 428/35; 206/497; 383/118, 903, 908; 426/129; 525/222, 240

[56] References Cited

U.S. PATENT DOCUMENTS

| | | | |
|---|---|---|---|
| 3,299,194 | 1/1967 | Golike | 264/210 |
| 3,365,520 | 1/1968 | Foster et al. | 526/331 |
| 3,399,250 | 8/1968 | Kirk et al. | 260/897 |
| 3,555,604 | 1/1971 | Pahlke | 425/72 R |
| 3,663,662 | 5/1972 | Golike et al. | 260/897 A |
| 3,663,663 | 5/1972 | McAda | 525/222 |
| 3,900,635 | 8/1975 | Funderburk, Jr. et al. | 428/218 |
| 3,983,258 | 9/1976 | Weaver | 426/129 |
| 4,136,205 | 1/1979 | Quattlebaum | 206/497 |
| 4,161,562 | 7/1979 | Yoshikawa et al. | 428/215 |
| 4,162,343 | 7/1979 | Wilcox et al. | 428/212 |
| 4,196,240 | 4/1980 | Lustig et al. | 383/908 |
| 4,277,578 | 7/1981 | Yoshimura et al. | 525/222 |
| 4,302,557 | 11/1981 | Yoshimura et al. | 525/211 |
| 4,303,710 | 12/1981 | Bullard et al. | 428/35 |
| 4,337,298 | 6/1982 | Karim et al. | 428/461 |
| 4,339,507 | 7/1982 | Kurtz et al. | 525/227 |
| 4,447,480 | 5/1984 | Lustig et al. | 428/35 |

*Primary Examiner*—John E. Kittle
*Assistant Examiner*—James J. Seidleck
*Attorney, Agent, or Firm*—John C. Lefever; Real J. Grandmaison

[57] ABSTRACT

A heat-shrinkable film suitable for use in fabricating bags for packaging frozen poultry. The film composition comprises a resin mixture of between about 75 and about 95 weight percent of an ethylene-vinyl acetate copolymer having a vinyl acetate content of from at least about 1.7 to about 5.0 weight percent, and having a melt index of from at least about 0.15 to about 0.35 decigram per minute; and between about 5 and about 25 weight percent of a polyethylene material selected from the group consisting of: (a) high density polyethylene having a melt index of between about 0.15 and about 0.70 decigram per minute, and a density of between about 0.94 and about 0.96 grams per cubic centimeter, and (b) low pressure-low density polyethylene having a melt index of between about 0.3 and about 3.0 decigrams per minute, and a density of between about 0.915 and about 0.925 gram per cubic centimeter.

33 Claims, No Drawings

SHRINKABLE FILM FOR POULTRY BAGS

REFERENCE TO RELATED APPLICATION

This application is a continuation-in-part of prior, copending application Ser. No. 445,941 filed on Dec. 1, 1982 entitled "Shrinkable Film for Poultry Bags", now U.S. Pat. No. 4,447,480.

FIELD OF THE INVENTION

This invention relates to a resin mixture, a heat-shrinkable film, and more particularly, to a heat-shrinkable film suitable for use in fabricating bags for packaging frozen poultry. In addition, the invention relates to a bag fabricated from the film.

The invention also relates to a resin mixture, and films and bags produced from the resin mixture for use in connection with the packaging of poultry.

BACKGROUND OF THE INVENTION

Generally, the packaging operation presently being commercially used to package frozen poultry necessitates that the packaging materials exhibit special properties. The typical packaging operation includes the following steps:
1. Dropping the bird into a bag fabricated from a shrinkable film;
2. Evacuating the bag;
3. Clamping the neck of the bag;
4. Transporting the bird with the entire weight thereof being supported by the neck of the bag;
5. Subjecting the bag to a temperature of from about 90° C. to about 95° C. for a period of time up to about 7 seconds to shrink the bag tightly around the bird;
6. Quick freezing and then storing the packaged bird at temperatures as low as about −40° C.; and
7. Transporting the packaged bird and thereby possibly subjecting the packaged bird to continuous abrasion and impact against adjacent packaged birds during shipping.

The packaging operation requires the shrinkable film to possess the following general properties:
1. Sufficient tensile strength to support the weight of the bird;
2. Shrinkage and reduction in the area of the film at a temperature of from about 90° C. to about 95° C., sufficient to conform the film to the irregular shape of the bird. Generally at least 25% linear size reduction (unrestrained) in the direction transverse to the machine direction of the film has been required, usually at least 29%, and preferably at least 31%.
3. Shrink force at a temperature of from about 90° C. to about 95° C., sufficient to pull the wings of a bird tightly towards the body, and sufficient residual shrink force to maintain a tight wrap around the bird;
4. Sufficient seal strength for a heat seal, so that after the film has been fabricated into a bag by a conventional heat sealing operation, there will be no seal failure during a subsequent shrink packaging operation at a temperature of from about 90° C. to about 95° C.; and
5. Impact strength and abrasion resistance at about −40° C., sufficient to protect the bird during freezing, shipping and consumer handling.

In addition to the above enumerated general requirements, the film must possess dimensional stability and non-tacky surfaces, and it should have processing characteristics which enable thickness control and high production efficiency at reasonable manufacturing speeds.

In the prior art, several film materials have been either used or proposed for packaging frozen poultry. For example, U.S. Pat. No. 3,555,604 to Pahlke discloses a process for producing bioriented low density polyethylene in the form of a shrinkable thermoplastic film. In this process, a tubing of polyethylene material defines an isolated film bubble maintained by simple nip rollers, and the bubble is subjected to heat and radial expansion by internal pressure near the draw point of the tubing, that is, the point at which the polyethylene material is at or just below its softening point. This process is generally referred to as the "double bubble" method.

The biaxial stretching of low density polyethylene can also be carried out by using an irradiated film and stretching it by methods well known in the art, to obtain a film having satisfactory melt strength and shrinkage values at a temperature of about 90° C. This film, however, is relatively expensive and has marginal heat sealing properties because of the loss of thermoplastic characteristics due to the crosslinking of the polymer chains induced by the irradiation. Irradiation also inhibits the reprocessing of waste film. The U.S. Pat. No. 3,365,520 to Foster et al describes the xylene solubility test for distinguishing between irradiated and non-irradiated polyethylene.

The aforementioned U.S. Pat. No. 3,365,520 also discloses a blend of an ionomer and an ethylene homopolymer or copolymer for producing a biaxially stretched film having exceptional shrinkage and shrink force at a temperature of about 90° C., and having good processing characteristics. Unfortunately, the film has very poor heat sealing properties for use in packaging poultry. While heat seal strength at room temperature is adequate, the strength at about 95° C. is extremely low.

The U.S. Pat. No. 3,900,635 to Funderburk et al discloses a multilayer film including a blend of an ionomer and ethylene homopolymers or copolymers, and another layer of ethylene homopolymers or copolymers. The film exhibits adequate shrinkage at about 90° C. and good seal strength. The film, however, does not possess certain other properties desirable for poultry packaging. For example, the abrasion resistance of this film is not significantly better than the abrasion resistance of a conventional biaxially stretched low density polyethylene single layer film.

Although each of the known films meets many of the requirements for packaging applications such as the packaging of frozen poultry, the need still exists for improved heat shrinkable films.

OBJECT OF THE INVENTION

One object of this invention is to provide a low cost heat shrinkable thermoplastic film which exhibits satisfactory heat seal strength at 95° C., high puncture resistance and high abrasion resistance.

Another object is to provide a low cost heat shrinkable thermoplastic film which can be manufactured in uniform thickness and flat width at high production speeds with minimum processing difficulties.

Still other objects of this invention will be apparent from the ensuing disclosure and appended claims.

SUMMARY OF THE INVENTION

In accordance with the present invention there is provided a resin mixture and a heat-shrinkable thermoplastic film prepared therefrom, the resin mixture comprising between about 75 and about 95 percent by weight, based on the weight of the film, of an ethylene-vinyl acetate copolymer having a vinyl acetate content of from at least about 1.7 to about 5.0 percent by weight, based on the weight of said ethylene-vinyl acetate copolymer, a melt index of from about 0.15 to about 0.35 decigram per minute; and between about 5 and about 25 percent by weight, based on the weight of film, of a polyethylene material selected from the group consisting of:

(a) low pressure-high density polyethylene having a melt index of between about 0.15 and about 0.70 decigram per minute, and a density of between about 0.94 and about 0.96 gram per cubic centimeter, and (b) low pressure-low density polyethylene having a melt index of between about 0.3 and about 3.0 decigrams per minute, and a density of between about 0.915 and about 0.925 gram per cubic centimeter.

The invention also relates to a heat-shrinkable film suitable for use in fabricating bags for packaging frozen poultry, comprising:

(1) from about 75 to about 95 percent by weight, based on the weight of the film, of an ethylene-vinyl acetate copolymer having a vinyl acetate content of from at least about 1.7 to about 5.0 percent by weight and a melt index of from at least about 0.15 to about 0.35 decigram per minute; and (2) from about 5 to about 25 percent by weight, based on the weight of the film, of a polyethylene material selected from the group consisting of:

(a) low pressure-high density polyethylene having a melt index of between about 0.15 and about 0.70 decigram per minute, and a density of between about 0.94 and about 0.96 gram per cubic centimeter, and (b) low pressure-low density polyethylene having a melt index of between about 0.3 and about 3.0 decigrams per minute, and a density of between about 0.915 and about 0.925 gram per cubic centimeter.

The film may also contain up to about 10 percent by weight, based on the weight of the film, of an additive selected from the group consisting of slip agents, antiblocking agents, pigments, and mixtures thereof.

The ethylene-vinyl acetate copolymer of this invention should have a vinyl acetate content of at least about 1.7 percent by weight and a melt index of at least 0.15 decigram per minute, because when the vinyl acetate content is below 1.7 percent and the melt index is not at least 0.15 decigram per minute, bubble stability is weak, thereby resulting in breaks and reduction in line production speeds, and the resultant film tends to be nonuniform in thickness and does not possess adequate shrinkage properties. These processing difficulties are avoided by using the above-specified vinyl acetate content and melt index. The ethylene-vinyl acetate copolymer of this invention should have a vinyl acetate content less than about 5.0 percent by weight and a melt index below about 0.35 decigram per minute, because when the vinyl acetate content is above 5.0 percent by weight and the melt index is substantially above 0.35 decigram per minute, the fabricated bags do not possess the required packaging strength properties and fail during handling. As a balance of these aforementioned properties it is preferred that the ethylene-vinyl acetate copolymer of this invention have a vinyl acetate content of between about 2.25 and about 4.5 percent by weight and a melt index of between about 0.2 and about 0.3 decigram per minute.

The low pressure-low density polyethylene used in this invention may comprise copolymers formed from ethylene and a comonomer selected from the group consisting of butene, pentene, hexene, heptene and octene, and mixtures thereof. These copolymers may have a melt index of between about 0.3 and about 3.0 decigrams per minute. However, it is preferred that the copolymers have a melt index of between about 0.5 and about 2.0 decigrams per minute because as the melt index decreases, viscosity increases and extrusion becomes more difficult, thereby requiring more powerful extruders. On the other hand, as melt index increases, the physical properties of the film diminish, notably tensile strength and puncture toughness energy. Accordingly, this melt index range is a preferred balance of these opposing considerations. The lower limit on the copolymer density is primarily dictated by the ability to produce the polymers below that value. Thus, it is preferred that the copolymers have a density of between about 0.915 and about 0.920 gram per cubic centimeter. Additionally, it is preferred that the low pressure-low density polyethylene comprise a copolymer of ethylene and butene-1.

The low pressure-low density polyethylene employed in this invention may also comprise heterogeneous copolymers formed from ethylene, and at least one comonomer selected from the group consisting of propylene and butene-1, and at least one $C_5$-$C_8$ comonomer. By the term heterogeneous, it is meant that the comonomer units are distributed randomly along the polymer chain, but the polymer chains do not have the same ethylene/comonomer ratio among the polymer molecules. The ethylene copolymers are interpolymers or copolymers of the monomers $C_2$, $C_a$ and $C_b$, wherein $C_2$ is ethylene, $C_a$ is selected from propylene, butene-1 and mixtures thereof, and $C_b$ is selected from one or more of the $C_5$ to $C_8$ alpha monoolefins which contain no branching closer than the fourth carbon atom. The $C_5$ to $C_8$ monomers include pentene-1, 4-methyl pentene-1, hexene-1, heptene-1 and octene-1. These heterogeneous copolymers have a density of between about 0.91 and about 0.94 gram per cubic centimeter and a melt index of between about 0.3 and about 3.0 decigrams per minute. However, it is preferred that the copolymers have a melt index of between about 0.5 and about 2.0 decigrams per minute, and a density of between about 0.915 and about 0.925 gram per cubic centimeter, because a better balance of physical properties in the film is thereby provided for the same reasons previously discussed in connection with the copolymers of ethylene and selected comonomers.

The low pressure-high density polyethylene of this invention may have a melt index of between about 0.15 and about 0.70 decigrams per minute, and a density of between about 0.94 and about 0.96 gram per cubic centimeter. However, it is preferred that the low pressure-high density polyethylene have a melt index of between about 0.15 to about 0.3 decigram per minute and a density of between about 0.945 and about 0.955 gram per cubic centimeter.

DETAILED DESCRIPTION OF THE INVENTION

In the best mode, the film of this invention comprises from about 80 to about 90 percent by weight, based on the weight of the film, of an ethylene-vinyl acetate copolymer having a vinyl acetate content of between about 2.25 and about 4.5 percent by weight of the copolymer, a melt index of between about 0.2 and about 0.3 decigram per minute; and between about 10 and about 20 percent by weight, based on the weight of the film, of a polyethylene material selected from the group consisting of low pressure-high density polyethylene having a melt index of between about 0.15 and about 0.3 decigram per minute, and a density of between about 0.945 and about 0.955 gram per cubic centimeter, and low pressure-low density polyethylene having a melt index of between about 0.5 and about 2.0 decigrams per minute and a density of between about 0.915 and about 0.920 gram per cubic centimeter. In addition, for optimum result herein, the ethylene-vinyl acetate copolymer should have a melting point of approximately 103° C. to about 106° C. It has also been found that as the amount of aforementioned polyethylene present in the instant film composition is decreased to a level of about 5 percent by weight, the film strength and stability during extrusion also decreases, thereby resulting in production discontinuities. Likewise, when the amount of polyethylene present in the film composition is increased to a level of about 30 percent by weight, the heat-shrinking properties of the film are substantially adversely affected. The range of between about 10 and about 20 percent by weight of a polyethylene material represents a preferred balance of these opposing considerations.

It is preferred that the film of this invention be prepared in accordance with the method described in the aforementioned U.S. Pat. No. 3,555,604 to Pahlke generally referred to as the "double bubble" method.

Generally, the thickness of the film may be from about 1.5 mils to about 2.75 mils. A film having a thickness less than about 1.5 mils tends to be physically weak for use in the poultry packaging industry, while a film having a thickness greater than about 2.75 mils tends to cause clipping problems (loss of vacuum) in the end use application. A film thickness range of between about 2.0 mils and about 2.4 mils is a preferred balance of these opposing considerations.

In general, various conventional additives such as slip agents, anti-blocking agents, and pigments can be incorporated in the films in accordance with conventional practice.

Illustrative, non-limiting examples of the features and practice of the invention are set out below. The parts and percentages set forth herein refer to parts by weight and percentages by weight, respectively, unless specifically stated otherwise. The properties of the polymers described herein, unless otherwise indicated, were determined according to the following test methods:

Density—ASTM D-1505
Melt Index—ASTM D-1238
　Polyethylene—ASTM D-1238, Condition E
　Ethylene-vinyl acetate—ASTM D-1238, Condition E In the following examples, the sample films were formed in accordance with the method described in the aforementioned U.S. Pat. No. 3,555,604 to Pahlke. Further, the film compositions represented in Table I comprised the following material compositions having the following properties. The high pressure-low density polyethylene (HPLDPE) of Example 1 had a melt index of about 0.08 decigram per minute and a density of about 0.917 gram per cubic centimeter. The low pressure-high density polyethylene (LPHDPE) of Examples 1, and 3 to 6 had a melt index of about 0.15 decigrams per minute and a density of about 0.953 gram per cubic centimeter. The ethylene-vinyl acetate (EVA) copolymer of Examples 2 to 10 comprised ethylene-vinyl acetate having a vinyl acetate content of about 2.7% by weight and a melt index of about 0.27 decigram per minute. The low pressure-low density polyethylene (LPLDPE) of Examples 7 to 10 had a melt index of about 2.0 decigrams per minute and a density of about 0.918 gram per cubic centimeter. The films of Examples 22 and 23 employed a low pressure-high density polyethylene (LPHDPE) having a melt index of about 0.16 decigram per minute and a density of about 0.953 gram per cubic centimeter, and an ethylene-vinyl acetate copolymer having a vinyl acetate content of about 4.5% by weight and a melt index of about 0.25 decigram per minute. The film of Example 24 employed a low pressure-high density polyethylene (LPHDPE) having a melt index of about 0.35 decigram per minute and a density of about 0.944 gram per cubic centimeter, and an ethylene-vinyl acetate copolymer having a vinyl acetate content of about 4.8% by weight and a melt index of about 0.24 decigram per minute. The concentrate (conc.) employed in Examples 1 to 10 and 22 to 24 provided a final film formulation which had 0.5% $TiO_2$ pigment and 0.5% "Superfloss" (diatomaceous earth sold by Manville Corporation, Denver, Colo.) antiblock agent.

EXAMPLES 1–10 AND 22–24

Th film compositions of Examples 1 to 10 and 22 to 24 were produced in accordance with the method described in U.S. Pat. No. 3,555,604 to Pahlke. Each film had a thickness of about 2.25 mils.

Table I compares the unrestrained machine direction and transverse direction shrinkage of the films of Examples 1 to 10 and 22 to 24 at a temperature of about 90° C., and also summarizes the processing ease during production of the films. As used herein, "processing ease" includes bubble stability, uniformity of film thickness and flat width, and high production speeds. The film of Example 1 is a prior art film presently in commercial use for the poultry packaging described herein, and it is thus shown for comparative purposes. The film composition of Example 2 is also shown for comparative purposes to illustrate the need for the presence of between 5 and 25 percent of the low pressure-high density polyethylene or the low pressure-low density polyethylene. That is, the Example 2 composition did not include either type of polyethylene and gave poor processing ease. Example 23 shows that the incorporation of 30 percent by weight of low pressure-high density polyethylene into the film composition results in lower shrinkage values for the film although the film contains an ethylene-vinyl acetate copolymer having a vinyl acetate content of 4.5 percent by weight. Example 24 shows that an ethylene vinyl acetate copolymer having a vinyl acetate content of 5.0 percent by weight is suitable for use in the practice of the present invention.

TABLE 1

| Example | HPLDPE % | LPHDPE % | EVA % | LPLDPE % | CONC. % | Unrestrained Shrinkage % | | Processing Ease |
|---|---|---|---|---|---|---|---|---|
| | | | | | | Machine Direction | Transverse Direction | |
| 1 | 85 | 10 | — | — | 5 | 20 | 32 | Good |
| 2 | — | — | 95 | — | 5 | 25 | 39 | Poor |
| 3 | — | 5 | 90 | — | 5 | 23 | 35 | Good |
| 4 | — | 10 | 85 | — | 5 | 22 | 34 | Good |
| 5 | — | 15 | 80 | — | 5 | 21 | 31 | Good |
| 6 | — | 20 | 75 | — | 5 | 21 | 30 | Good |
| 7 | — | — | 90 | 5 | 5 | 21 | 33 | Good |
| 8 | — | — | 85 | 10 | 5 | 21 | 35 | Good |
| 9 | — | — | 80 | 15 | 5 | 23 | 34 | Good |
| 10 | — | — | 75 | 20 | 5 | 24 | 35 | Good |
| 22 | — | 25 | 70 | — | 5 | 22 | 32 | Good |
| 23 | — | 30 | 65 | — | 5 | 20 | 27 | Good |
| 24 | — | 20 | 75 | — | 5 | 22 | 32 | Good |

EXAMPLES 11 TO 16

The film compositions of Examples 11 to 16 were produced in the same manner as Examples 1-10 to compare the use of another ethylene-vinyl acetate copolymer in the preparation of the film composition of this invention. The ethylene-vinyl acetate (EVA) copolymer of Examples 11 to 16 comprised ethylene-vinyl acetate having a vinyl acetate content of about 2.5% by weight and a melt index of about 0.16 decigram per minute. All other materials used in Examples 11 to 16, that is, the high pressure-low density polyethylene (HPLDPE), the low pressure-high density polyethylene (LPHDPE), the low pressure-low density polyethylene (LPLDPE), and the low concentrate (conc.) were the same materials as described relative to Examples 1 to 10. Table 2 summarizes the foregoing film compositions of Examples 11 to 16 which were also prepared in accordance with the method described in U.S. Pat. No. 3,555,604 to Pahlke, and the unrestrained machine direction and transverse direction shrinkage values obtained therefor are also shown. As in Examples 1 to 10, each film had a thickness of about 2.25 mils. Table 2 shows that the Example 11 composition (without polyethylene) gave poor processing ease. Also, the Example 13 composition (5 wt. % LPLDPE) provided fair processing ease and represents an embodiment of the invention. However, the Example 14 composition included 10 wt. % LPLDPE and provided good processing ease, and supports the lower limit of the 10-15 wt. % preferred range for polyethylene content. The reason for the 15 wt. % preferred upper limit is that heat shrinkability begins to decline above this value.

vinyl acetate contents. In each instance the film was produced in the same manner as the films of Examples 1-16, and formed into bags (only Examples 17-19). The composition of control Example 17 was identical to the composition of control Example 1. That is, the high pressure-low density polyethylene (HPLDPE) had a melt index of about 0.08 decigram per minute and a density of about 0.917 gram per cubic centimeter. The low pressure-high density polyethylene (LPHDPE) used in the three compositions 17-19 had a melt index of about 0.15 decigram per minute and a density of about 0.953 gram per cubic centimeter. The ethylene-vinyl acetate (EVA) copolymer of Examples 18 and 19 had a melt index of 0.25. The EVA polymer of Examples 20 and 21 had a melt index of 0.18. Inspection of Table 3 indicates that the compositions of Examples 20 and 21 exhibited poor processing ease, so that it was not possible to form bags therefrom for the shaker tests. The poor performance of these compositions is primarily due to the low vinyl acetate content, i.e. only about 1.5% by weight vinyl acetate based on the weight of the ethylene-vinyl acetate copolymer.

Shaker Table Test

One frozen hen turkey of 15-16 lbs. was placed in each bag. The bags were then evacuated, clipped and heat shrunk at 195°-205° F. around the turkey. Four of the bagged turkeys were then placed breast up side-by-side in a cardboard box having overall dimensions of 24 inches long, 12 inches high and 20 inches wide. The box was positioned on an agitation table and agitated for 30 minutes using an elliptical motion with a 0.75 G force and at a rate of 3 cycles per second. The bags were then

TABLE 2

| Example | HPLDPE % | LPHDPE % | EVA % | LPLDPE % | CONC. % | Unrestrained Shrinkage % | | Processing Ease |
|---|---|---|---|---|---|---|---|---|
| | | | | | | Machine Direction | Transverse Direction | |
| 11 | — | — | 95 | — | 5 | 20 | 34 | Poor |
| 12 | — | 10 | 85 | — | 5 | 20 | 32 | Good |
| 13 | — | — | 90 | 5 | 5 | 22 | 34 | Fair |
| 14 | — | — | 85 | 10 | 5 | 20 | 34 | Good |
| 15 | — | — | 80 | 15 | 5 | 23 | 33 | Good |
| 16 | — | — | 75 | 20 | 5 | 22 | 34 | Good |

EXAMPLES 17 TO 21 AND 25

Another series of tests (Shaker Table Tests) was performed to demonstrate the effect of vinyl acetate content in the ethylene-vinyl acetate used to manufacture the heat shrinkable film. In particular, the effect was determined on the puncture resistance of frozen turkey-containing bags manufactured from films using different checked for breakage. A total of sixteen turkeys were bagged using the film of each composition, so that four agitation tests were involved for each film. The results of these tests are summarized in Table 3.

Table 3 indicates that the preferred film composition of Example 19, which contained 2.5% vinyl acetate, provided a high puncture resistance, which was as effective as the control film of Example 17, which contained high HPLDPE content. That is, in each instance none of the sixteen test bags were punctured during the shaker test. Moreover, a comparison between Examples 18 and 19 reveals that the former film composition with 4.5% vinyl acetate and 10% LPHDPE only provided fair results during the shaker tests, as three of the sixteen bags were punctured. However, Example 25 shows that increasing the level of the LPHDPE to 20% by weight of the film composition containing the EVA copolymer having a vinyl acetate content of 4.5% by weight results in good film performance. These data support the preferred range of between about 2.25% and about 4.5% by weight vinyl acetate content in the ethylene-vinyl acetate copolymer.

TABLE 3

| Example | HPLDPE % | LPHDPE % | EVA % | VA % | CONC. % | Unrestrained Shrinkage % | | Processing Ease | Shaker Table Breaks |
| --- | --- | --- | --- | --- | --- | --- | --- | --- | --- |
| | | | | | | Machine Direction | Transverse Direction | | |
| 17 | 85 | 10 | — | — | 5 | 20 | 32 | good | 0/16 |
| 18 | — | 10 | 80 | 4.5 | 10 | 24 | 33 | good | 3/16 |
| 19 | — | 10 | 85 | 2.5 | 10 | 22 | 34 | good | 0/16 |
| 20 | — | 10 | 85 | 1.5 | 5 | 17 | 24 | poor | — |
| 21 | — | — | 95 | 1.5 | 5 | 14 | 25 | poor | — |
| 25 | — | 20 | 75 | 4.5 | 5 | 22 | 32 | good | 0/16 |

Thus, the novel film compositions of this invention have been shown to possess the physical properties required for use in packaging frozen poultry. Furthermore, the film compositions of the present invention also have the toughness required during the biaxial stretching process, in order to provide a substantially stable operation with few bubble breaks, while providing a film possessing the requisite physical properties with respect to shrinkage characteristics.

Although preferred embodiments of this invention have been described in detail, it is contemplated that modification thereof may be made and some preferred features may be employed without others, all within the spirit and scope of the broad invention.

We claim:

1. A heat-shrinkable film, suitable for used in fabricating bags for packaging frozen poultry, comprising a mixture of between about 75 and about 95 percent by weight, based on the weight of said film, of an ethylene-vinyl acetate copolymer having a vinyl acetate content of from at least about 1.7 to about 5.0 percent by weight, based on the weight of said ethylene-vinyl acetate copolymer, and having a melt index of from at least about 0.15 to about 0.35 decigram per minute; and between about 5 and about 25 percent by weight, based on the weight of said film, of a polyethylene material selected from the group consisting of:
   (a) low pressure-high density polyethylene having a melt index of between about 0.15 and about 0.70 decigram per minute, and a density of between about 0.94 and about 0.96 gram per cubic centimeter, and
   (b) low pressure-low density polyethylene having a melt index of between about 0.3 and about 3.0 decigrams per minute, and a density of between about 0.915 and about 0.925 gram per cubic centimeter.

2. The film of claim 1 wherein said ethylene-vinyl acetate copolymer has a vinyl acetate content of between about 2.25 and about 4.5 percent by weight and a melt index of between about 0.2 and about 0.3 decigram per minute.

3. The film of claim 1 wherein said low pressure-low density polyethylene is a copolymer formed from ethylene and a comonomer selected from the group consisting of butene, pentene, hexene, heptene and octene, and mixtures thereof.

4. The film of claim 1 wherein said polyethylene material comprises between about 10 and about 20 percent by weight of the film.

5. The film of claim 3 wherein said copolymer has a melt index of between about 0.3 and about 3.0 decigrams per minute.

6. The film of claim 3 wherein said copolymer has a melt index of between about 0.5 and about 2.0 decigrams per minute, and a density of between about 0.915 and about 0.920 gram per cubic centimeter.

7. The film of claim 1 wherein said low pressure-low density polyethylene is a heterogeneous copolymer formed from ethylene, and at least one comonomer selected from the group consisting of propylene and butene-1, and at least one $C_5$-$C_8$ comonomer.

8. The film of claim 7 wherein said copolymer has a density of between about 0.91 and about 0.94 gram per cubic centimeter, and a melt index of between about 0.3 and about 3.0 decigrams per minute.

9. The film of claim 7 wherein said copolymer has a melt index of between about 0.5 and about 2.0 decigrams per minute, and a density of between about 0.915 and about 0.925 gram per cubic centimeter.

10. The film of claim 1 wherein said low pressure-high density polyethylene has a melt index of between about 0.15 and about 0.3 decigram per minute, a density of between about 0.945 and about 0.955 gram per cubic centimeter.

11. The film of claim 10 wherein said low pressure-low density polyethylene has a melt index of between about 0.5 and about 2.0 decigrams per minute, and a density of between about 0.915 and about 0.920 gram per cubic centimeter.

12. The film of claim 1 fabricated in the form of a bag.

13. A heat-shrinkable film suitable for use in fabricating bags for packaging frozen poultry, comprising a mixture of from about 75 to about 90 percent by weight, based on the weight of said film, of an ethylene-vinyl acetate copolymer having a vinyl acetate content of between about 1.7 and about 5.0 percent by weight of said copolymer, and having a melt index of between about 0.15 and about 0.35 decigram per minute; and between about 10 and about 25 percent by weight, based on the weight of said film, of a polyethylene material selected from the group consisting of:
   (a) low pressure-high density polyethylene having a melt index of between about 0.15 and about 0.70 decigram per minute, and a density of between about 0.94 and about 0.96 gram per cubic centimeter, and
   (b) low pressure-low density polyethylene having a melt index of between about 0.3 and about 3.0 decigrams per minute, and a density of between about 0.915 and about 0.925 gram per minute.

14. The film of claim 13 wherein said ethylene-vinyl acetate copolymer has a melting point of about 103° C. to about 106° C.

15. The film of claim 13 wherein said ethylene-vinyl acetate copolymer has a vinyl acetate content of between about 2.25 and to about 4.5 percent by weight, based on the weight of said copolymer, a melt index of between about 0.2 to about 0.3 decigram per minute, and a density of about 0.917 gram per cubic centimeter.

16. The film of claim 13 wherein said film has a thickness of from about 1.5 mils to about 2.75 mils.

17. The film of claim 13 fabricated in the form of a bag.

18. A resin mixture comprising between about 75 to about 95 percent by weight of an ethylene-vinyl acetate copolymer having a vinyl acetate content of from at least about 1.7 to about 5.0 percent by weight, based on the weight of said ethylene-vinyl acetate copolymer, and having a melt index of from about 0.15 to about 0.35 decigram per minute; and between about 5 and about 25 percent by weight, based on the weight of said resin mixture, of a polyethylene material selected from the group consisting of:
  (a) low pressure-high density polyethylene having a melt index of between about 0.15 and about 0.70 decigram per minute, and a density of between about 0.94 and about 0.96 gram per cubic centimeter, and
  (b) low pressure-low density polyethylene having a melt index of between about 0.3 and about 3.0 decigrams per minute, and a density of between about 0.915 and about 0.925 gram per centimeter.

19. A resin mixture as in claim 18 wherein said ethylene-vinyl acetate copolymer has a vinyl acetate content of between about 2.25 and about 4.5 percent by weight and a melt index of between about 0.20 and about 0.30 decigram per minute.

20. A resin mixture as in claim 18 wherein said low pressure-low density polyethylene is a copolymer formed from ethylene and a comonomer selected from the group consisting of butene, pentene, hexene, heptene and octene, and mixtures thereof.

21. A resin mixture as claimed in claim 18 wherein said polyethylene material comprises between about 10 and about 20 percent by weight of said resin mixture.

22. A resin mixture as in claim 20 wherein said copolymer has a melt index of between about 0.3 and about 3.0 decigrams per minute.

23. A resin mixture as in claim 20 wherein said copolymer has a melt index of between about 0.5 and about 2.0 decigrams per minute, and a density of between about 0.915 and about 0.920 gram per cubic centimeter.

24. A resin mixture as in claim 18 wherein said low pressure-low density polyethylene is a heterogeneous copolymer formed from ethylene, and at least one comonomer selected from the group consisting of propylene and butene-1, and at least one $C_5$-$C_8$ comonomer.

25. A resin mixture as in claim 24 wherein said copolymer has a density of between about 0.91 and about 0.94 gram per cubic centimeter and a melt index of between about 0.3 and about 3.0 decigrams per minute.

26. A resin mixture as in claim 24 wherein said copolymer has a melt index of between about 0.5 and about 2.0 decigrams per minute, and a density of between about 0.915 and about 0.925 gram per cubic centimeter.

27. A resin mixture as in claim 18 wherein said low pressure-high density polyethylene has a melt index of between about 0.15 and about 0.3 decigram per minute, and a density of between about 0.945 and about 0.955 gram per cubic centimeter.

28. A resin mixture as in claim 27 wherein said low pressure-low density polyethylene has a melt index of between about 0.5 and about 2.0 decigrams per minute, and a density of between about 0.915 and about 0.920 gram per cubic centimeter.

29. A resin mixture comprising from about 80 to about 90 percent by weight of an ethylene-vinyl acetate copolymer having a vinyl acetate content of between about 1.7 and about 5.0 percent by weight of said copolymer, and having a melt index of between about 0.15 and about 0.35 decigram per minute; and between about 10 and about 20 percent by weight, based on the weight of said resin mixture, of a polyethylene material selected from the group consisting of:
  (a) low pressure-high density polyethylene having a melt index of between about 0.15 and about 0.70 decigram per minute, and a density of between about 0.94 and about 0.96 gram per cubic centimeter, and
  (b) low pressure-low density polyethylene having a melt index of between about 0.3 and about 3.0 decigrams per minute, and a density of between about 0.915 and about 0.925 gram per cubic centimeter.

30. A resin mixture as in claim 29 wherein said ethylene-vinyl acetate copolymer has a melting point of about 103° C. to about 106° C.

31. A resin mixture as in claim 29 wherein said ethylene-vinyl acetate copolymer has a vinyl acetate content of between about 2.25 to about 4.5 percent by weight, based on the weight of said copolymer, a melt index of between about 0.20 to about 0.30 decigram per minute, and a density of about 0.917 gram per cubic centimeter.

32. A resin mixture as in claim 29 wherein said mixture is in the form of an extruded film having a thickness of from about 1.5 mils to about 2.75 mils.

33. A resin mixture as in claim 32 wherein said film is fabricated in the form of a bag.

* * * * *

UNITED STATES PATENT AND TRADEMARK OFFICE
CERTIFICATE OF CORRECTION

PATENT NO. : 4,547,413

DATED : October 15, 1985

INVENTOR(S) : Stanley Lustig, Jeffrey M. Schuetz and Stephen J. Vicik

It is certified that error appears in the above-identified patent and that said Letters Patent is hereby corrected as shown below:

Column 9, line 43, following "suitable for", delete "used" and substitute therefor -- use --.

Signed and Sealed this

Fourth Day of February 1986

[SEAL]

Attest:

DONALD J. QUIGG

Attesting Officer

Commissioner of Patents and Trademarks